United States Patent [19]
Katoh

[11] Patent Number: 5,522,654
[45] Date of Patent: Jun. 4, 1996

[54] CORE BAR OF RUBBER CRAWLER AND RUBBER CRAWLER

[75] Inventor: Yusaku Katoh, Fukuyama, Japan

[73] Assignee: Fukuyama Gomu Kogyo Kabushiki Gaisha, Hiroshima, Japan

[21] Appl. No.: 39,089

[22] PCT Filed: Oct. 16, 1991

[86] PCT No.: PCT/JP91/01415

§ 371 Date: Apr. 14, 1993

§ 102(e) Date: Apr. 14, 1993

[87] PCT Pub. No.: WO92/06884

PCT Pub. Date: Apr. 30, 1992

[30] Foreign Application Priority Data

Oct. 18, 1990 [JP] Japan ................................ 2-109474

[51] Int. Cl.⁶ ................................................. B62D 55/24
[52] U.S. Cl. ............................ 305/174; 305/167; 305/169
[58] Field of Search .................... 305/35 R, 35 EB, 305/38, 39

[56] References Cited

U.S. PATENT DOCUMENTS 4,904,030  2/1990  Ono ..................... 305/35 EB

FOREIGN PATENT DOCUMENTS

| 0240384 | 9/1989 | Japan | 305/35 EB |
| 0266080 | 10/1989 | Japan | 305/35 R |
| 01-173091 | 12/1989 | Japan . | |
| 02-40683 | 3/1990 | Japan . | |
| 02-26781 | 7/1990 | Japan . | |

*Primary Examiner*—Russell D. Stormer
*Attorney, Agent, or Firm*—Lane, Aitken & McCann

[57] ABSTRACT

A core bar of a rubber crawler has right and left wing portions, an engaging part at the longitudinal center thereof, protruding parts to prevent disengagements of a wheel, the protruding parts projecting upwardly from the wing portions with a fixed height on both ends of the engaging part, and at least one horizontal projection provided within a width of the protruding part on respective widthwise side faces of a core bar, the horizontal projection protruding at almost the same level as the wing portions in a direction perpendicular to the widthwise side faces of the core bar.

32 Claims, 8 Drawing Sheets

CORE BAR OF RUBBER CRAWLER AND RUBBER CRAWLER

FIELD OF THE INVENTION

The present invention relates to a rubber crawler to be attached to an under-carriage of a traveling construction machine.

BACKGROUND OF THE INVENTION

Steel caterpillars have usually been attached to the under-carriages of traveling construction machines, but in recent years rubber crawlers have been applied as well.

Figure 9:
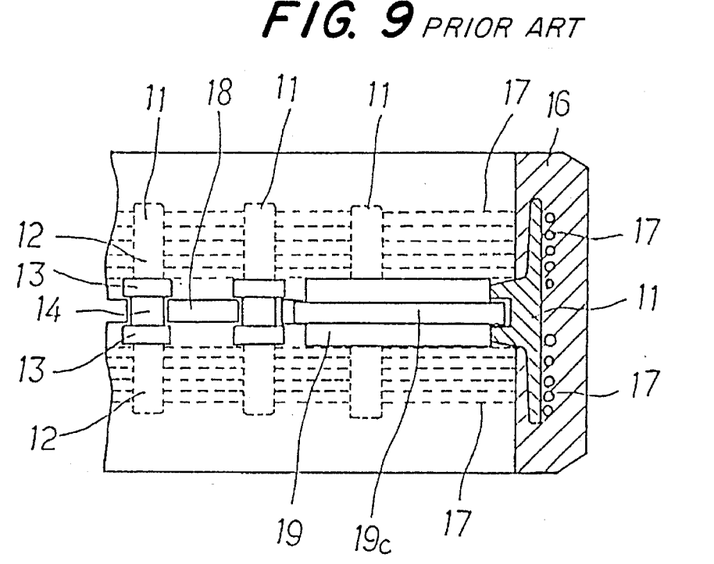
FIGS. 9 and 10 show conventional examples.

FIG. 9 shows a conventional rubber crawler 16 on which an idler wheel 19 is rolling. The reference numeral 11 is a core bar. The reference numerals 12, 13 and 14 indicate a wing portion, a protruding part to prevent disengagements of a wheel, and an engaging part with a driving wheel, respectively, all of the core bar 11. The numeral 17 is a steel cord, 18 is an engaging hole, and 19c is a center rolling part of the idler wheel 19. As shown in this figure, the center rolling part 19c travels between protruding parts 13, 13 so that disengagements of the wheel can be prevented.

Figure 10:
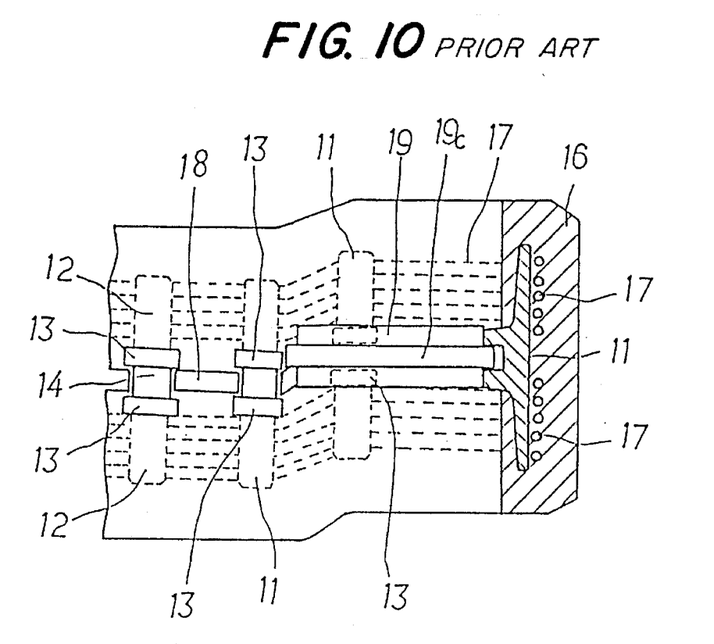

Compared with a steel crawler, the above rubber crawler has the disadvantage that disengagements of the crawler may easily happen. This is mainly because the rubber crawler is partially twisted to thereby disengage from the wheel, when it turns on a stepped ground in the workshop. FIG. 10 shows disengagement of the wheel. The crawler is slided sideways between the adjacent core bars 11, 11, and therefore the center rolling part 19c of the idler wheel 19 runs on the protruding part 13, thereby causing the disengagement 20 of the wheel from the crawler.

To overcome this problem, increasing the widthwise strength of the rubber crawler may be considered. Then, if the interval of core bars in the rubber crawler is narrowed as the width thereof is broadened in order to increase the strength of the rubber crawler, the widthwise edge portions of each core bar become angulate at their turning point, which places the rubber crawler in a polygonal shape. Accordingly, the rubber crawler suffers much bending fatigue, and therefore its durability decreases.

On the other hand, if a short-pitched rubber crawler (wherein the core bars' interval is half of the conventional rubber crawler's core bar interval by embedding core bars of narrower width arranged for the interval) is applied in order to increase the strength, it is excellent in preventing disengagements of a wheel because of the narrower interval of the embedded core bars than in a conventional rubber crawler, and is excellent in the durability as well. However, this has not become a perfect means yet, but still causes disengagements of the crawler in a large-sized construction machine.

SUMMARY OF THE INVENTION

Therefore, objects of the present invention are to overcome the above-mentioned problems and to provide a rubber crawler which is free from partial slidings and disengagements of a wheel from the crawler.

DETAILED DESCRIPTION OF THE PREFERRED EMBODIMENTS

Reference numerals and marks in FIGS. 1 to 8 will be quoted in the ensuing description for easy understanding of the content, but it should be understood that each figure shows only an example. First, a core bar of rubber crawler according to the present invention is characterized by a core bar 1, wherein an engaging part 3 is provided at the longitudinal center thereof, and horizontal projections 5 protruding in a direction perpendicular to the widthwise side faces of the core bar are provided to at least one side of the engaging part 3 on the respective side faces of the core bar.

In this case, it is preferable to thicken the bottom face side of the engaging part 3 and both sides thereof and to provide the horizontal projections 5 to the closest possible position to said bottom face side.

Figure 1:
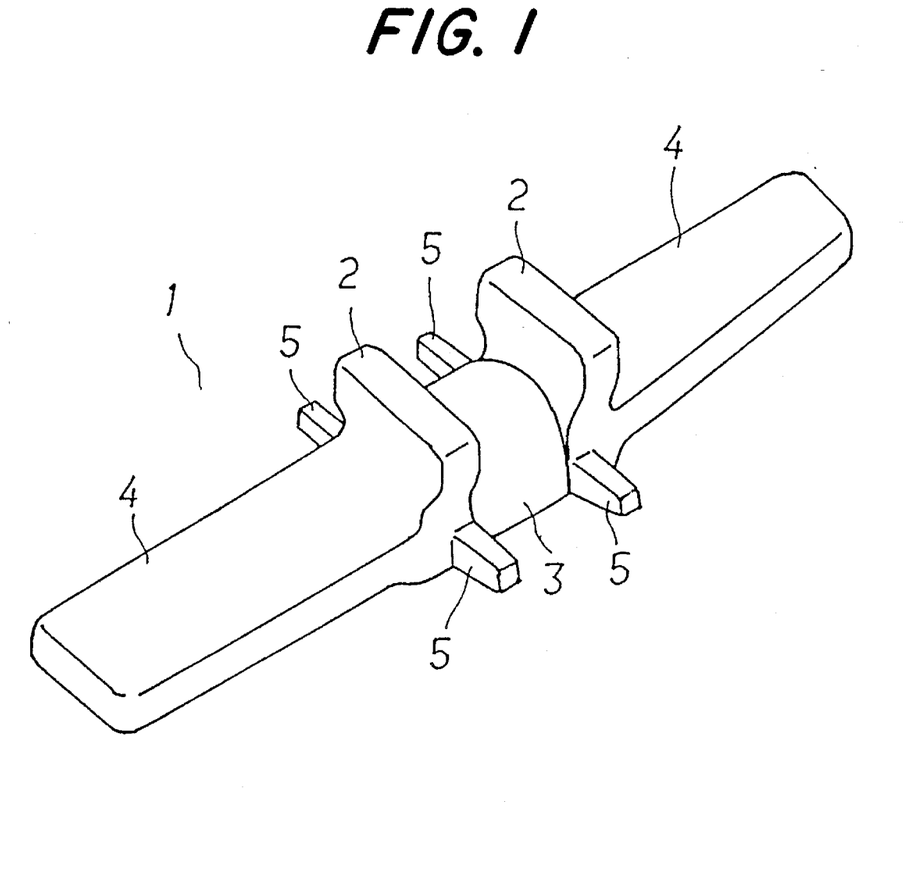
FIG. 1 is a perspective view of a core bar of a first embodiment according to the present invention.
Figure 7:
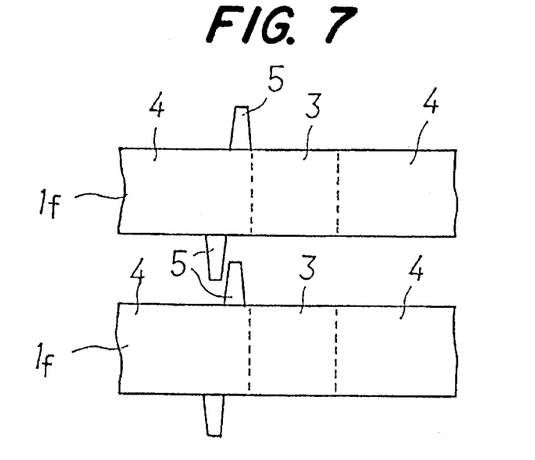
FIGS. 7 and 8 show further embodiments of the core bars according to the present invention.

Besides, in the above mentioned core bar of rubber crawler, the horizontal projections 5 are to be provided on at least one side of the engaging part 3 on the respective widthwise side faces of the core bar 1. Therefore, one horizontal projection 5 may be provided on each side of the engaging part 3 so as to form a pair thereof, as shown in FIG. 1 for example, or may be provided on only one side of the engaging part 3, as shown in FIG. 7 for example. In this case, it is preferable that the horizontal projections on the respective widthwise side faces of the core bar body should be disposed symmetrically.

A core bar of a rubber crawler is not limited to the above examples. It may be provided with one horizontal projection 5 on one side of the engaging part and a pair of horizontal projections on the other side thereof on the respective widthwise side faces, as shown in FIG. 5B for example. In this case, it is preferable that the horizontal projections on the respective widthwise side faces of the core bar body are disposed symmetrically. Furthermore, a core bar of a rubber crawler may be provided with one horizontal projection 5 on only one side of the engaging part 3 on one widthwise side face of the core bar and a pair of horizontal projections 5, 5 on only one side of the engaging part 3 on the other widthwise side face, with the horizontal projections on the respective side faces disposed in the same line along the width direction of the core bar body.

Figure 6A:
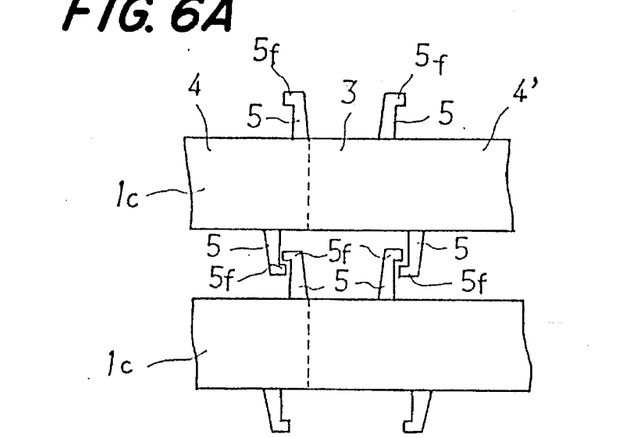
FIGS. 6A, 6B and 6C show the fourth, the fifth and the sixth embodiments, respectively, of the core bars according to the present invention.
Figure 6B:
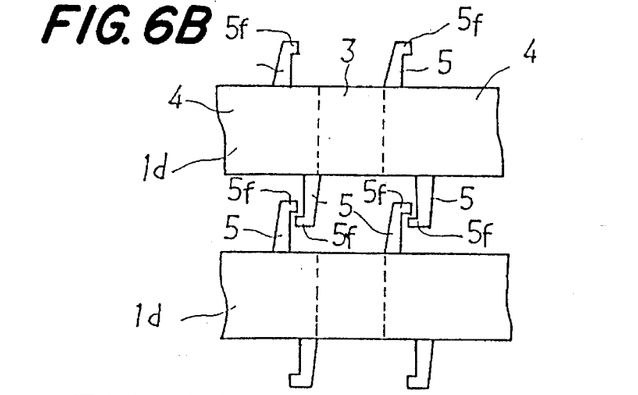

Moreover, a horizontal projection 5 may be provided with a hook 5f, or a bi-directional hook 5f'. In this case, if there are plural horizontal projections 5 on the respective widthwise side faces of the core bar body, each hook 5f may be disposed in the same protruding direction as shown in FIG. 6B, or in the opposite protruding direction as shown in FIG. 6A.

Figure 3A:
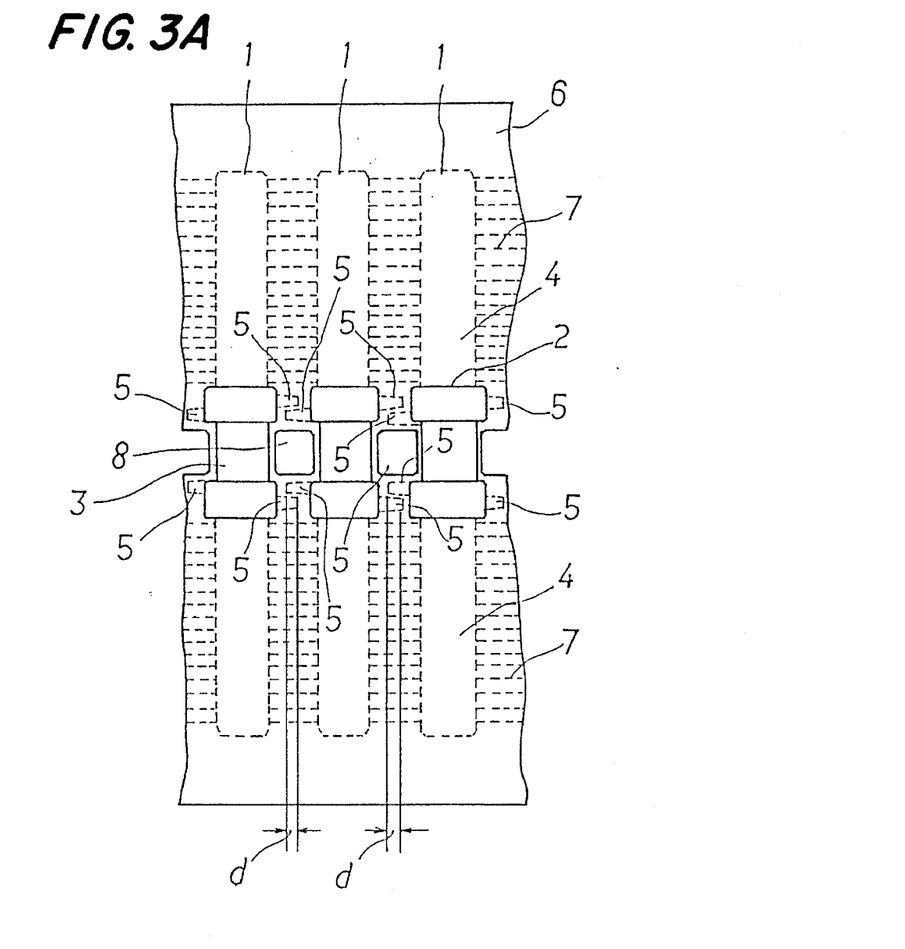
FIGS. 3A and 3B are a plane view and a sectional view, respectively, of the rubber crawler, in which the core bars according to the first embodiment are embedded.
Figure 3B:
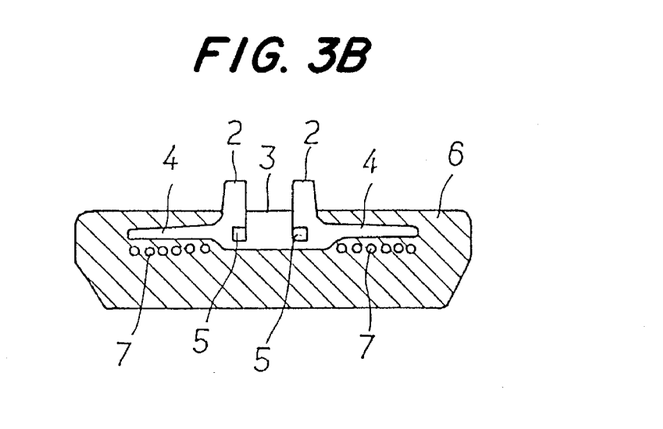

In the rubber crawler of the present invention, the abovementioned core bars of rubber crawler are embedded in the circumferential direction of the rubber crawler body a equal intervals. As shown in FIG. 3 for example, each horizontal projection 5 is overlapped in the interval of the core bars 1 in the width direction of the core bar 1, and is embedded inside the crawler body.

In this rubber crawler, even when the rubber crawler is in a condition to slide sideways, the horizontal projections 5 of the adjacent core bars of the rubber crawler body run against each other in the width direction to thereby prevent sideways slidings of the rubber crawler and, consequently, disengagements of a wheel.

The horizontal projections 5 of the core bar in the above rubber crawler are embedded in the vicinity of a layer of steel cords 7. At this time, the horizontal projections 5 may be disposed on the inner side of the steel cords 7 or on the outer side thereof.

In this rubber crawler, since the horizontal projections 5 are disposed in the vicinity of the layer of the steel cords 7, even when the rubber crawler is bent to the inner or outer peripheral side, the horizontal projections 5 can keep a suitable part overlapped to thereby cause no trouble in traveling or operating motions.

Figure 8:
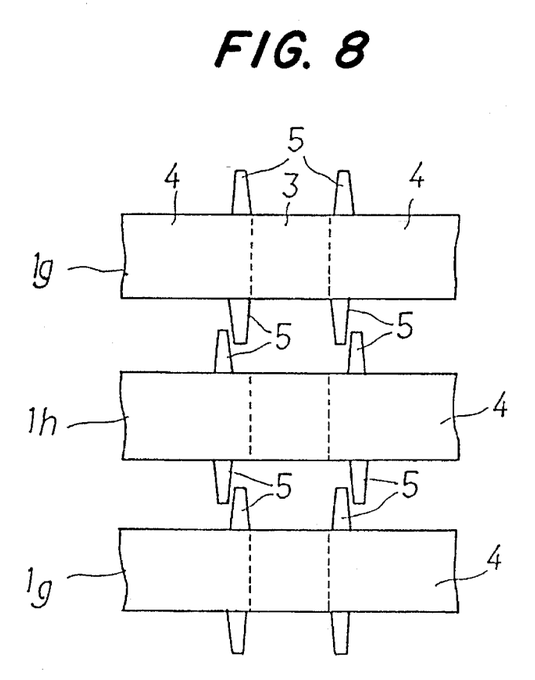

In the rubber crawler of the present invention, the same core bars may be arrayed continuously, or two different kinds of core bars may be arrayed alternately as shown in FIG. 8.

Figure 6C:
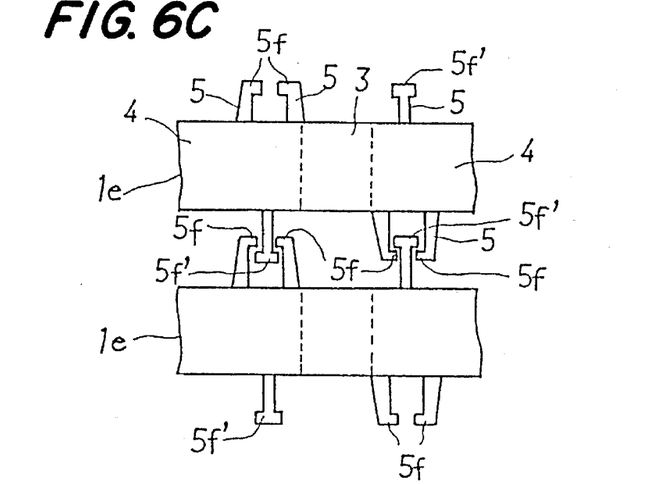

Moreover, in the core bars of the rubber crawler, hooks 5 or bi-directional hooks 5f' of the overlapped horizontal projections may be mutually engaged, as shown in FIG. 6 for example. These engagements of the hooks prevent separations of the core bars 1 in the width direction thereof.

In this rubber crawler, even when an outer force to separate the core bars occurs, separation of the core bars does not occur because of the engagements of hooks 5f or bi-directional hooks 5f', thereby preventing the separation of the core bars from the rubber crawler. Accordingly, durability of the rubber crawler greatly increases.

First of all, the first embodiment is explained in connection with FIGS. 1–4. In FIG. 1, the reference numeral 1 is a core bar, 2 is a projection to prevent disengagements of a wheel, 3 is an engaging part with a driving wheel, 4 is a wing portion and 5 is a horizontal projection. As shown in this figure, horizontal projections 5, 5 are provided on both sides of the engaging part 3, which is located in the middle, lengthwise, of the core bar, in the width direction of the core bar on the respective side faces thereof.

Figure 2A:
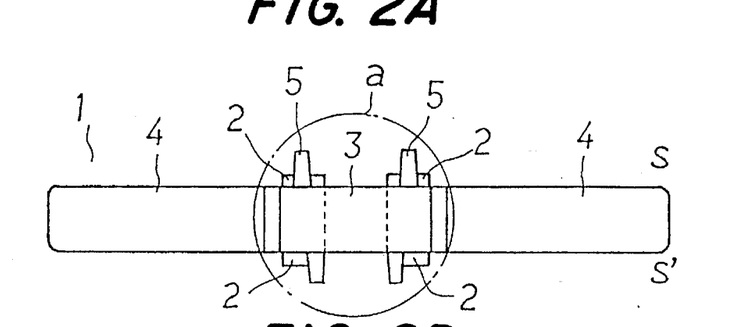
FIGS. 2A, 2B and 2C are a bottom face view, a side elevational view in the width direction and the same in the length direction, respectively, of a core bar of the first embodiment.
Figure 2B:
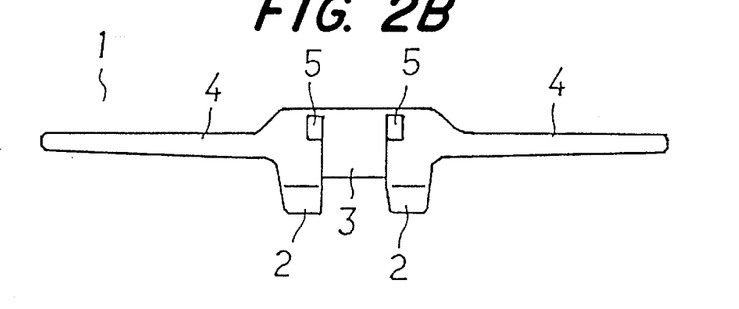
Figure 2C:
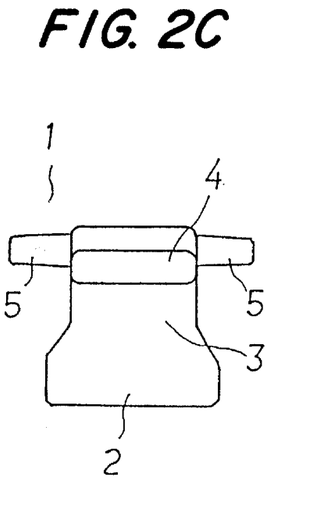
Figure 2D:
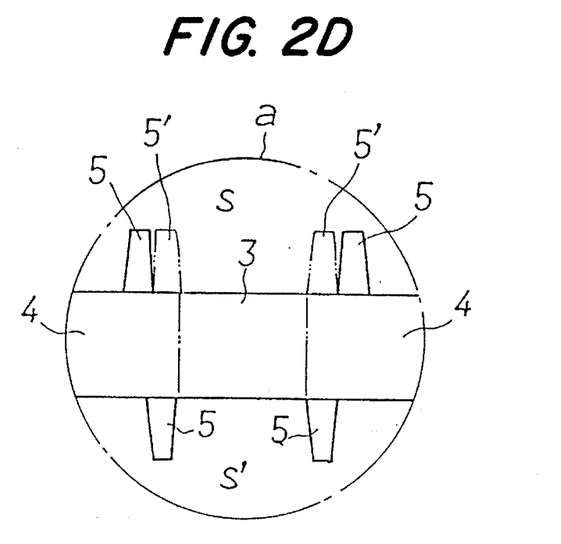
FIG. 2D is a partially enlarged view of the portion of the core bar within the circle "a" in FIG. 2A.

The positional relation of the respective horizontal projections 5 provided on both side faces, widthwise, of the core bar is explained in connection with FIGS. 2A and 2D. The imaginary positions 5', 5' indicated by two-dot chain lines beside the respective horizontal projections 5, 5 on the side face S are in a right symmetrical position with respect to the horizontal projections 5, 5 on the side face S' (a symmetrical relation for the center of the core bar). Besides, as is shown in FIGS. 2B and 2C, the bottom face of the engaging part 3 and both sides thereof are thickened for disposing the horizontal projections 5 as close as possible to the bottom face.

The core bars 1 of the above structure are embedded in the rubber crawler, as is shown in FIG. 3A. At this time, the facing horizontal projections 5,5 between the adjacent core bars 1, 1 are overlapped in the width direction of the core bar 1, and the overlapped region d is so set up as to cause no difficulty with the turning motions of the rubber crawler. In this rubber crawler, even when a widthwise directed outer force is imposed on the interval of the core bars 1, the horizontal projections 5, 5 run against each other to thereby prevent the rubber crawler from sliding sideways for more than a fixed distance. Besides, the horizontal projections 5, 5 are provided on both sides of the engaging part 3, and so do not overlap with the area in which steel cords 7 are buried. As shown in FIG. 3B, the horizontal projections 5 are provided as close as possible to the bottom face, and therefore are located in the vicinity of the layer of the steel cords 7, when they are embedded. Accordingly, even when the rubber crawler is bent to the inner or outer peripheral side, there is no big change in the overlapped region d of the horizontal projections 5, 5.

Figure 4A:
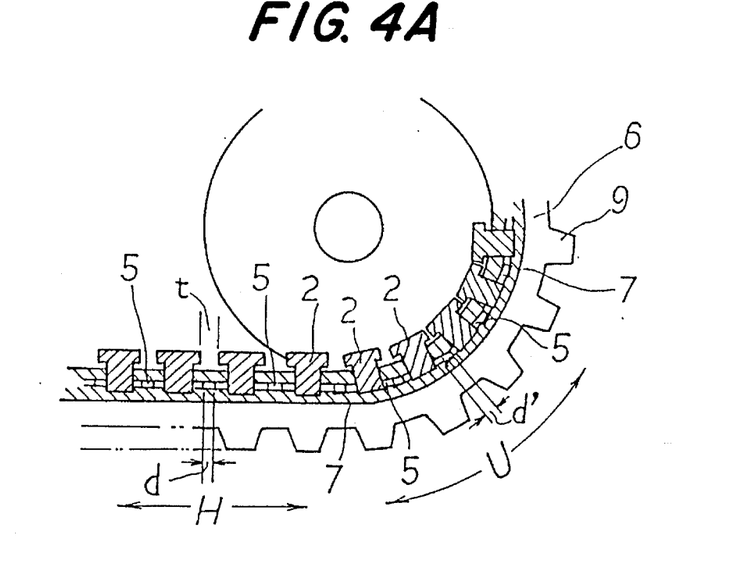
FIGS. 4A and 4B are side views of a rubber crawler illustrating the intervals of overlapped horizontal projections in bending parts.
Figure 4B:
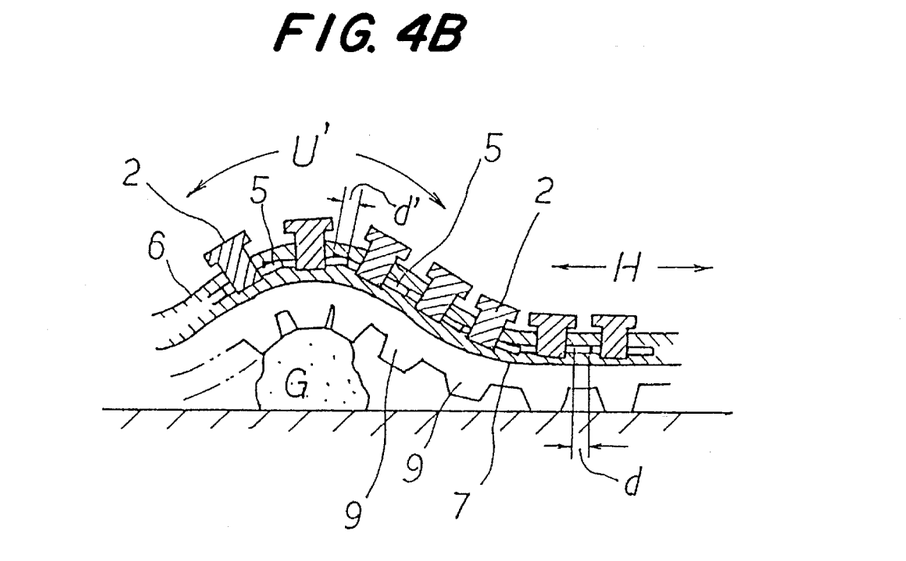

FIG. 4A shows a rubber crawler whose inner periphery is bent and depressed at its turning point on a driving wheel or an idler wheel. At the bent portion U, the inner periphery of the rubber crawler is compressed while the outer periphery thereof is elongated, centering the layer of steel cords. The compressive ratio increases in accordance with the distance from the layer of the steel cords toward the inner periphery, while the elongative ratio increases in accordance with the distance from the layer of the steel cords toward the outer periphery. In this figure, the interval t of the top faces of the projections 2 of the core bars becomes almost zero at the bent portion U. However, since the horizontal projections 5 are provided near the layer of the steel cords, the overlapped space d' at the level portion slightly changes into a space d' at the bent portion. FIG. 4B shows that the outer periphery of the rubber crawler is partially bent and depressed (the sink phenomenon) when the rubber crawler is on an obstacle G. In this case as well the overlapped space slightly changes into the spaced d at the bent portion U', and therefore the overlapped space is still kept. Accordingly, in either above case, the horizontal projections keep a suitable overlapped space there between to thereby cause no difficulty with the traveling or operating motions of the rubber crawler. Though the horizontal projections are provided on the inner side of the steel cords layer in these figures, the present invention is not limited to this example, but the horizontal projections may be also provided on the outer side of the steel cords layer.

Figure 5A:
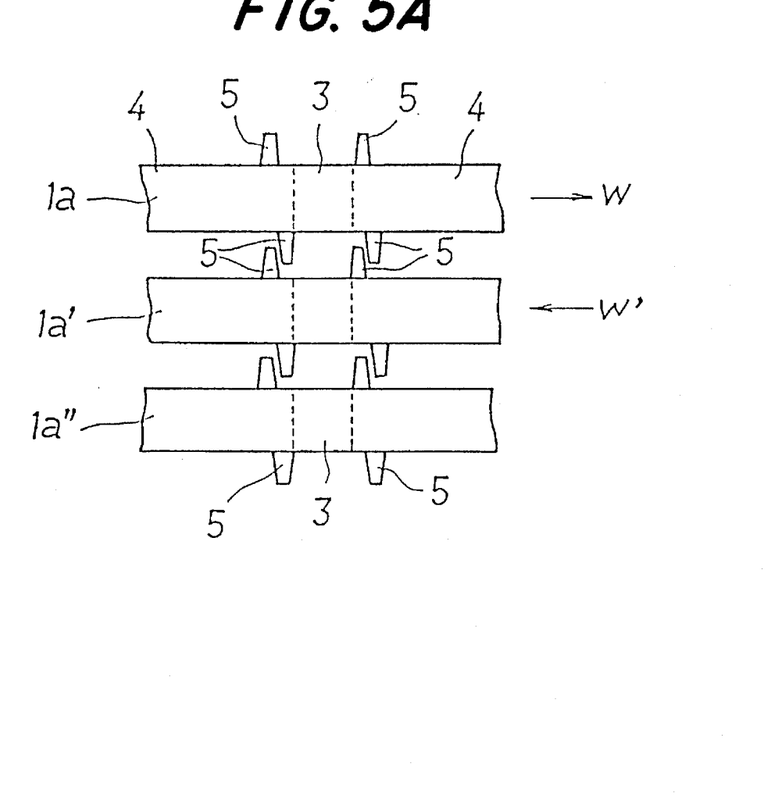
FIGS. 5A and 5B show the second and the third embodiments, respectively, of the core bars according to the present invention.
Figure 5B:
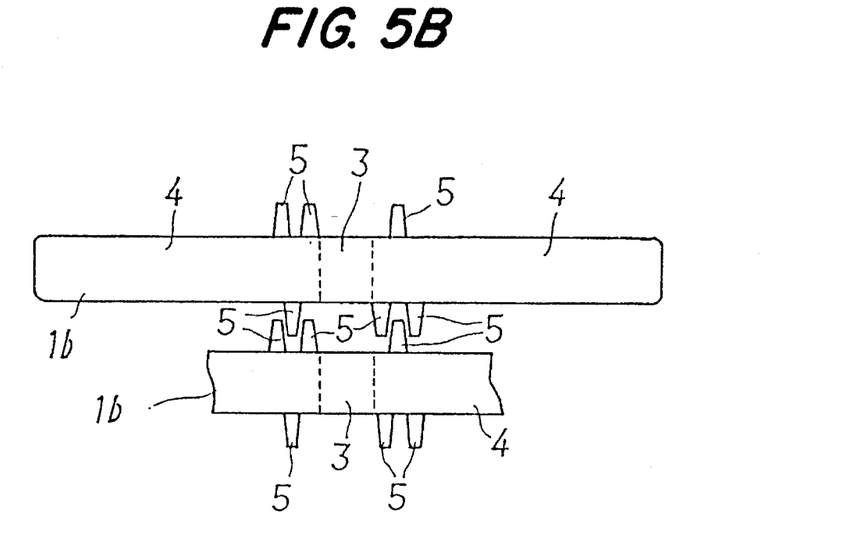

In the second embodiment of the present invention shown in FIG. 5A, the respective horizontal projections 5 provided on both of the side faces of the engaging part are in a right symmetrical position. Namely, both of the side faces have the same construction of the horizontal projections 5. Thereby, no mistakes are caused in arranging the core bars in manufacturing processes. In this figure, when the core bars 1a and 1a' slide sideways in the directions W and W', respectively, the horizontal projections do not run against each other between these core bars. However, they run against each other between the core bars 1a' and 1a" to thereby prevent partial slidings.

In the third embodiment, shown in FIG. 5B, a horizontal projection 5 on one side face is held by two horizontal projections 5, 5 on the facing side face to thereby prevent slidings perfectly.

FIGS. 6A, 6B and 6C show the forth, the fifth and the sixth embodiments of the present invention, respectively. Each tip end of the horizontal projections is provided with a hook 5f in the same direction, or with a bidirectional hook 5f'. Those hooks engage with each other to thereby prevent the separations of the core bars and breakaways thereof from the rubber crawler. Accordingly, the durability of the rubber crawler increases.

The present invention is not limited to the foregoing embodiments, but horizontal projections may be disposed on only one side of an engaging part, as shown in FIG. 7. Besides, as shown in FIG. 8, two kinds of core bars 1g, 1h may be embedded alternately in the rubber crawler body.

I claim:

1. A core bar of a rubber crawler, having right and left wing portions having an upper surface, an engaging part at the longitudinal center thereof, protruding parts to prevent disengagements of a wheel, said protruding parts projecting upwardly from the wing portions with a fixed height on both ends of the engaging part, and at least one horizontal projection provided within a width of the protruding part on respective widthwise side faces of a core bar, said horizontal projection being below the upper surface of the wing portions and protruding in a direction perpendicular to the widthwise side faces of the core bar.

2. A core bar of a rubber crawler according to the claim 1, wherein one horizontal projection is provided within a width of the protruding part on each end of the engaging part so as to form a pair on respective widthwise side faces of the core bar.

3. A core bar of a rubber crawler according to claim 2, wherein an interval between a pair of horizontal projections is the same or different on respective widthwise side faces of the core bar.

4. A core bar of rubber crawler according to claim 1, wherein one horizontal projection is provided only one side of the engaging part.

5. A core bar of rubber crawler according to claim 4, wherein the horizontal projections on the respective widthwise side faces of the core bar are in a right symmetrical arrangement.

6. A core bar of rubber crawler according to claim 1, wherein one horizontal projection is provided on one side of the engaging part, and two horizontal projections are provided on the other side thereof, on the respective widthwise side faces of the core bar.

7. A core bar of rubber crawler according to claim 6, wherein the horizontal projections of the respective widthwise side faces of the core bar are in a right symmetrical arrangement.

8. A core bar of rubber crawler according to claim 1, wherein one horizontal projection is provided on one side of the engaging part on one widthwise side face of the core bar, and two horizontal projections are provided on one side of the engaging part on the other widthwise side face of the core bar, with said horizontal projections on the respective widthwise side faces of the core bar disposed in the same line along the width direction of the core bar.

9. A core bar of rubber crawler according to claim 1, wherein a hook or bi-directional hook is provided on the tip of the horizontal projection.

10. A core bar of rubber crawler according to claim 9, wherein the hooks of the plural horizontal projections on the respective widthwise side faces of the core bar are disposed so that each may protrude in the same direction or in the opposite direction.

11. A rubber crawler having a crawler body and core bars embedded in the crawler body at equal intervals in the circumferential direction of the crawler body, each core bar having right and left wing portions having an upper surface, an engaging part at the longitudinal center thereof, protruding parts to prevent disengagements of a wheel which project upwardly from the wing portions with a fixed height on both ends of the engaging part, and at least one horizontal projection provided within a width of the protruding part on respective widthwise side faces of the core bar, said horizontal projection being below the upper surface of the wing portions, protruding in a direction perpendicular to the widthwise side faces of the core bar, and being entirely embedded in the crawler body.

12. A rubber crawler according to claim 11, wherein the core bars of rubber crawler are embedded with their horizontal projections located in the vicinity of a layer of steel cords.

13. A rubber crawler according to claim 12, wherein the horizontal projections are disposed on an inner peripheral side of the steel cords.

14. A rubber crawler according to claim 11, wherein the same core bars of rubber crawler are continuously arrayed.

15. A rubber crawler according to claim 11, wherein a hook or bi-directional hook is provided on the tip of the horizontal projection, the hooks of the plural horizontal projections on the respective side faces of the core bar are disposed so that each may protrude in the same direction or in the opposite direction, and the hooks or/and bi-directional hooks of the overlapped horizontal projections engage with each other to thereby prevent separations of the adjacent core bars in the width direction thereof.

16. The rubber crawler according to claim 11, wherein one horizontal projection is provided within a width of the protruding part on each end of the engaging part so as to form a pair on respective widthwise side faces of the core bar.

17. The rubber crawler according to claim 11, wherein one horizontal projection is provided on only one side of the engaging part.

18. The rubber crawler according to claim 11, wherein one horizontal projection is provided on one side of the engaging part, and two horizontal projections are provided on the other side thereof, on the respective widthwise side faces of the core bar.

19. The rubber crawler according to claim 18, wherein the horizontal projections of the respective widthwise side faces of the core bar are in a right symmetrical arrangement.

20. The rubber crawler according to claim 11, wherein one horizontal projection is provided on one side of the engaging part on one widthwise side face of the core bar, and two horizontal projections are provided on one side of the engaging part on the other widthwise side face of the core bar, with said horizontal projections on the respective widthwise side faces of the core bar disposed in the same line along the width direction of the core bar.

21. The rubber crawler according to claim 11, wherein a hook or bi-directional hook is provided on the tip of the horizontal projection.

22. The rubber crawler according to claim 21, wherein the hooks of the plural horizontal projections on the respective widthwise side faces of the core bar are disposed so that each may protrude in the same direction or in the opposite direction.

23. The rubber crawler according to claim 11, wherein two different kinds of core bars are arrayed alternately.

24. A core bar of a rubber crawler having right and left wing portions, an engaging part at the longitudinal center thereof, protruding parts to prevent disengagements of a wheel, said protruding parts projecting upwardly from the wing portions with a fixed height on both ends of the engaging part, a thick part formed at bottom faces of the engaging part and both ends thereof on respective widthwise side faces of a core bar, said thick part being at a somewhat lower level than the wing portions, and at least one horizontal projection provided within a width of the protruding part on the thick part, said horizontal projection protruding in a direction perpendicular to the widthwise side faces of the core bar.

25. A core bar of a rubber crawler according to the claim 24, wherein one horizontal projection is provided within a width of the protruding part on each end of the engaging part so as to form a pair on respective widthwise side faces of the core bar.

26. A core bar of rubber crawler according to claim 24, wherein one horizontal projection is provided on only one side of the engaging part.

27. A core bar of rubber crawler according to claim 24, wherein one horizontal projection is provided on one side of the engaging part, and two horizontal projections are provided on the other side thereof, on the respective widthwise side faces of the core bar.

28. A core bar of rubber crawler according to claim 24, wherein one horizontal projection is provided on one side of the engaging part on one widthwise side face of the core bar, and two horizontal projections are provided on one side of the engaging part on the other widthwise side face of the core bar, with said horizontal projections on the respective widthwise side faces of the core bar disposed in the same line along the width direction of the core bar.

29. A core bar of rubber crawler according to claim 24, wherein a hook or bi-directional hook is provided on the tip of the horizontal projection.

30. A rubber crawler having a crawler body and core bars embedded in the crawler body at equal intervals in the circumferential direction of the crawler body, each core bar having right and left wing portions, an engaging part at the longitudinal center thereof, protruding parts to prevent disengagements of a wheel which project upwardly from the wing portions with a fixed height on both ends of the engaging part, a thick part formed at bottom faces of the engaging part and both ends thereof on respective widthwise side faces of a core bar said thick part being at a somewhat lower level than the wing portions, and at least one horizontal projection provided within a width of the protruding part on the thick part, said horizontal projection protruding in a direction perpendicular to the widthwise side faces of the core bar.

31. The rubber crawler according to claim 30, wherein an interval between a pair of horizontal projections is the same or different on respective widthwise side faces of the core bar.

32. The rubber crawler according to claim 30, wherein one horizontal projection is provided within a width of the protruding part on each end of the engaging part so as to form a pair on respective widthwise side faces of the core bar.

* * * * *